Dec. 4, 1951  B. CONES  2,577,405
PROPORTIONING FLOW DAMPER
Filed May 3, 1950  2 SHEETS—SHEET 1

INVENTOR,
BEN CONES,
By Herbert A. Newton,
ATTORNEY.

Dec. 4, 1951  B. CONES  2,577,405
PROPORTIONING FLOW DAMPER
Filed May 3, 1950  2 SHEETS—SHEET 2

INVENTOR,
BEN CONES,
By Herbert A. Weinturn,
ATTORNEY.

Patented Dec. 4, 1951

2,577,405

UNITED STATES PATENT OFFICE 2,577,405

PROPORTIONING FLOW DAMPER

Ben Cones, Indianapolis, Ind.

Application May 3, 1950, Serial No. 159,681

11 Claims. (Cl. 138—45)

This invention relates to a damper for use in air flow pipes such as are commonly employed in heating installations. The damper is employed as a means for proportioning volume flow of the air through the pipe so that the effective percentage of closure across the pipe may be varied by the damper being placed in adjusted positions in accordance with the flow desired.

The damper is in the nature of a collapsible element which may be expanded to a maximum retarding of the flow in the pipe, to a collapsed condition for the maximum flow.

A primary object of the invention is to provide not only a very effective proportioning damper means, but also to provide a noise proof structure which will remain in adjustment. A further important object of the invention is a provide a damper structure whereby there will be an effective equal distribution of flow around the entire perimeter of the damper element.

These and many other objects and advantages of the invention will become apparent to those versed in the art in the following description of one particular form of the invention, as illustrated in the accompanying drawings, in which Fig. 1 is a view in central vertical section to a length of pipe to which the invention is applied;

Figure 1:
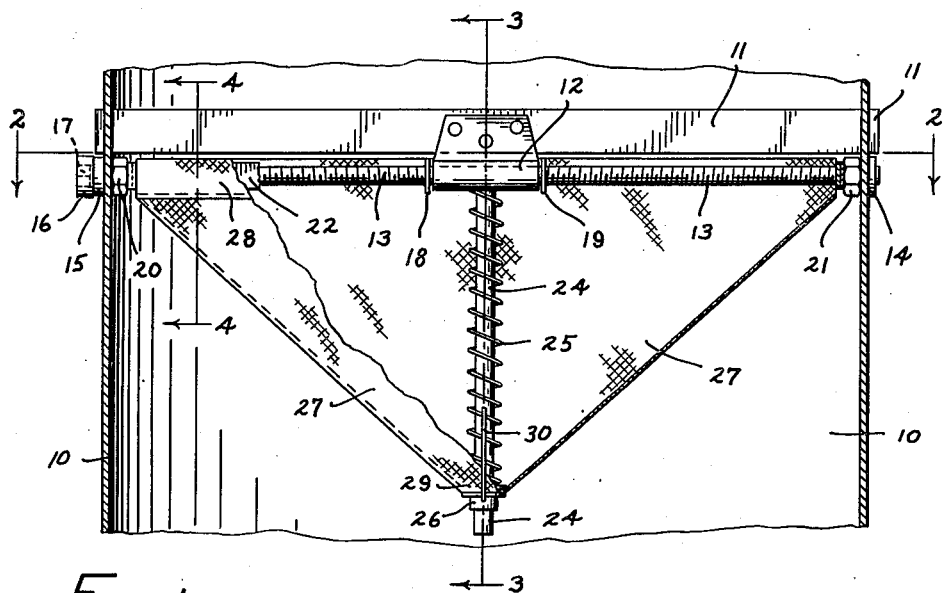
Figure 4:
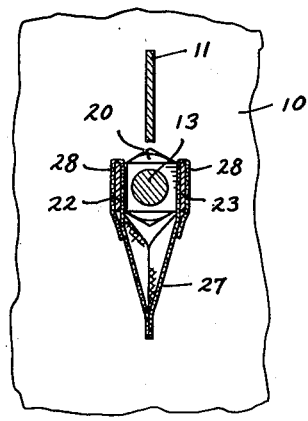

Fig. 4 a detail in vertical section on the line 4—4 in Fig. 1.

Diametrically across a length of round pipe 10 is fixed a bar 11, herein shown as being rectangular in section so that it will remain fixed in position and will not revolve about its own axis. There is fixed centrally of this bar 11 a stirrup 12 to extend down below and provide a bearing through which an operating rod 13 may revolubly be carried.

This rod 13 extends diametrically across the pipe 10 immediately under the bar 11 and is parallel thereto. The rod 13 extends rotatively by its ends through the pipe 10. The rod 13 is fixed against longitudinal travel relative to the pipe 10 by any suitable means, herein shown as by having a washer 14 on one end outside of the pipe 10 and a washer 15 on its other end and outside of the pipe 10 and fixed to the rod so as to restrain the rod against travel across the pipe 10. On one end of the rod 13 externally of the pipe 10 there is fixed some means for rotating the rod 13 about its own axis, such means being herein shown as consisting of a head 16 fixed to the rod 13 and having a socket 17 therein into which any suitable wrench or key may be inserted.

Where it is desired that the rod 13 will be supported by bearings thicker than the wall of the pipe 10, the washers 14 and 15 may be fixed in a stationary manner to the outside of the pipe 10, and the rod 13 allowed to rotate within those washers. In this case, there are fixed to the rod 13 at opposite end portions of the stirrup 12, abutments 18 and 19 in the nature of washers fixed to the rod. In other words the rod 13 is then restrained against longitudinal travel in respect to the stirrup 12, and consequently in respect to the pipe 10.

The rod 13 is screw-threaded about both end portions between the wall of the pipe 10 and the stirrup 12. The threads on one portion are right-hand threads and on the other portion are left-hand threads.

Screw-threadedly engaging the rod 13 inside of the pipe 10 are the nuts 20 and 21. Two spring members 22 and 23 have their ends respectively fixed to the nuts 20 and 21, to have the spring member 22 on the one side of the rod 13 and the spring member 23 on the other side. The length of the members 22 and 23 are such that when the nuts 20 and 21 are in their extreme outward positions adjacent the wall of the pipe 10, these members 22 and 23 come into approximate parallelism with the rod 13, being deflected from that state only by the width of the stirrup 12 and possibly the washers 18 and 19. The members 22 and 23 may assume any particular shape in respect to their cross-section, such as being round or rectilinear, and are herein shown as rectilinear in the nature of flat spring material.

A post 24 is fixed to the underside and centrally thereof of the stirrup 12 to extend downwardly therefrom. Surrounding this post 24 is a spring 25 which normally urges a grommet 26 to a lowermost position on the post 24.

A fabric member generally designated by the numeral 27 is, in its collapsed state generally triangular in shape with a double wall so that it may be expanded from the flat triangular shape to a conical condition open across its face end. This member 27 is provided with a hem 28 around its face, and the spring member 22 is extended through this hem 28 on the one side and the member 23 extended through the hem 28 on the other side. The apex end 29 of the member 27 is secured to the grommet 26. The post 24 and spring 25 extend downwardly from the base end of the member 27 inside of the member to extend outwardly therefrom only through the grommet 26. The member 27 is thus normally held in a collapsed condition such as a bag would be when it is emptied. The member 27 is preferably made out of a material such as woven synthetic resinous fibers.

Figure 2:
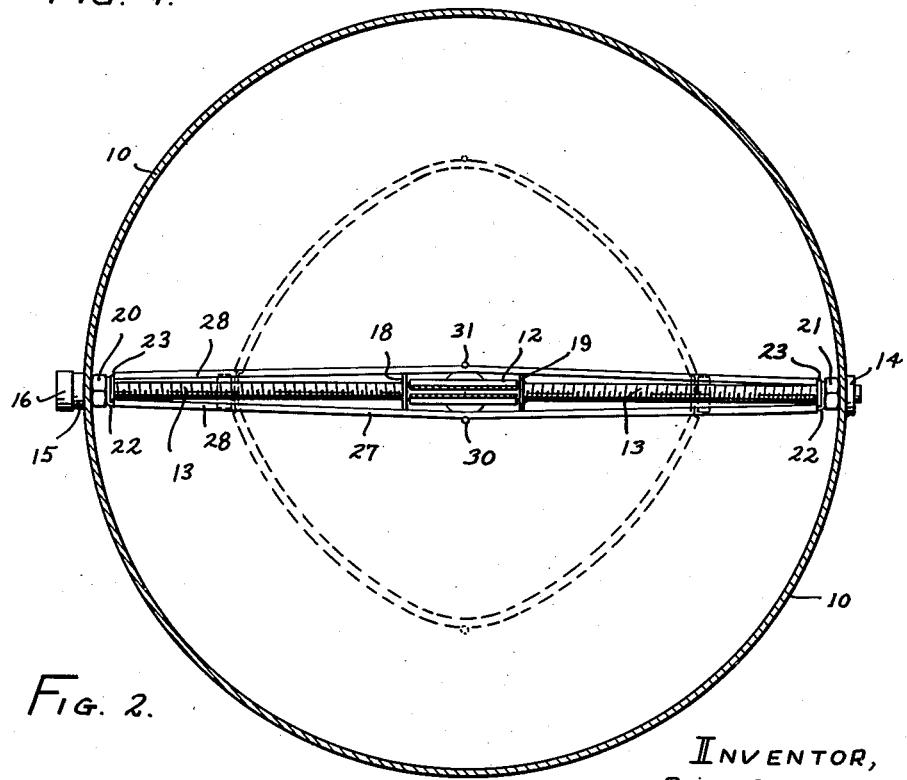
Fig. 2 is a transverse section on the line 2—2 in Fig. 1.
Figure 3:
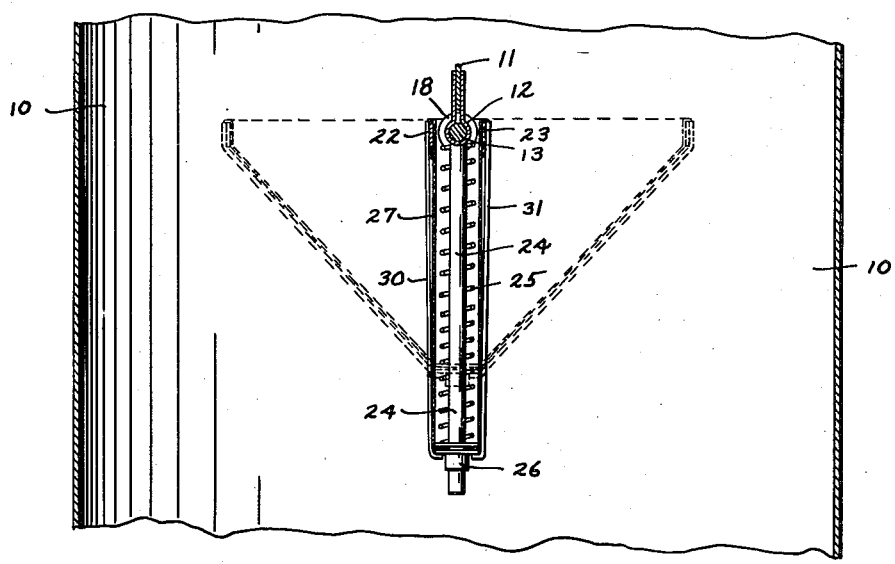
Fig. 3 is a section on the line 3—3 in Fig 1.

With the member 27 collapsed as indicated throughout the several views in the drawings, the maximum volume flow through the pipe 10 is maintained. Then when that flow is to be varied and reduced the rod 13 is turned to cause the nuts 20 and 21 to travel one toward the other with the consequent result that the spring members 22 and 23 will bow outwardly one from the other to assume finally some such contour as indicated by the dash lines in Figs. 2 and 3. In so doing, the grommet 26 will tend to travel upwardly along the post 24 to be resisted by the spring 25 so that the member 27 will be held taut at all times. In order to stabilize the spring members 22 and 23 it is preferable that there be side spring wires 30 and 31, the upper ends of which are attached respectively to the spring members 22 and 23 through the hem 28, and the lower ends of which are secured to the grommet 26, in both instances as shown as being on the outside of the member 27. These members 30 and 31 tend to retain the top edges of the spring members 22 and 23 in a common plane when those members are bowed outwardly.

When the member 27 is distended by its open end under the bowing action of the members 22 and 23, the effective opening of the flow through the pipe 10 is thus reduced, the reduction depending upon the degree of distention of the opening into the member 27. The post 24 is directed against the flow of air in the pipe 10, so that a smooth surface is presented to the oncoming flow. By reason of the member 27 being at all times under spring tension through the spring 25, and also through the members 22 and 23, there is no "flopping" of the member 27 permissible, and thus there is no possibility of noise arising by reason of the flow of air passed the damper construction.

By reason of the stirrup 12 being fixed to the stationary bar 11, the post 24 is always maintained on the longitudinal axial line of the pipe 10 so that when the members 22 and 23 bow the opening end of the member 27 outwardly, there will be substantially an equal spacing around all sides of the open end of the member 27 and the inside of the pipe 10. There will in effect be a slight distortion from a true circle, but this distortion is of no particular consequence. The damper may of course be returned to its normal inoperative condition by properly turning the rod 13 to bring all of the parts back to the solid line positions shown in the drawings.

Therefore while I have herein shown and described my invention in one particular form, it is obvious that structural variations may be employed without departing from the spirit of the invention, and I therefore do not desire to be limited to that precise form beyond the limitations which may be imposed by the following claims.

I claim:

1. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag.

2. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts.

3. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts; a rod surrounding member located centrally of said rod; a post extending normally from said surrounding member and into said bag from its base; and a spring between said surrounding member and the apex of the bag normally tending to hold the bag in a collapsed flattened condition.

4. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts; a rod surrounding member located centrally of said rod; a post extending normally from said surrounding member and into said bag from its base; and a spring between said surrounding member and the apex of the bag normally tending to hold the bag in a collapsed flattened condition; and stay members extending from said apex to said bag base.

5. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts; a rod surrounding member located centrally of said rod; a post extending normally from said surrounding member and into said bag from its base; and a spring between said surrounding member and the apex of the bag normally tending to hold the bag in a collapsed flattened condition; a bar carried by said pipe adjacent said rod; said surrounding member being secured to said bar to hold that surrounding member against revolution around the bar whereby said post is rigidly positioned in respect both to said bag and said pipe.

6. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along oppostie sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts; a rod surrounding member located centrally of said rod; a post extending normally from said surrounding member and into said bag from its base; and a spring between said surrounding member and the apex of the bag normally tending to hold the bag in a collapsed flattened condition; a bar carried by said pipe adjacent said rod; said surrounding member being secured to said bar to hold that surrounding member against revolution around the bar whereby said post is rigidly positioned in respect both to said bag and said pipe; and a slide member fixed in said bag apex, through which said post extends, and against which said spring bears.

7. A damper construction for use in a flow pipe comprising a rod to extend substantially diametrically across and be revolubly carried by the pipe; means for maintaining the rod against longitudinal travel; right-hand threads on one end portion of the rod; left-hand threads on the other end portion; a nut screw-threadedly engaged on each of said threaded portions; a pair of spring members fixed by their ends to said nuts to position one member along one side and the other member along the other side of said rod; a triangular bag having an open end across its base; said spring members being engaged one each along opposite sides of the base of said bag whereby the members will be bowed outwardly one from the other by rotation of said rod to cause said nuts to travel therealong one toward the other and by said bowed members open the bag; said spring members being in the nature of leaf springs and said intervening rod insuring oppositely bowing of the members upon advancement one toward the other of said nuts; a rod surrounding member located centrally of said rod; a post extending normally from said surrounding member and into said bag from its base; and a spring between said surrounding member and the apex of the bag normally tending to hold the bag in a collapsed flattened condition; a bar carried by said pipe adjacent said rod; said surrounding member being secured to said bar to hold that surrounding member against revolution around the bar whereby said post is rigidly positioned in respect both to said bag and said pipe; and a slide member fixed in said bag apex, through which said post extends, and against which said spring bears; and elastic stay members fixed by end portions respectively to said slide member and to said base connected spring members, said stay members engaging the spring members intermediate the spring member ends.

8. A damper construction for varying volume flow comprising a pipe; a collapsible damper comprising a generally triangular shaped flexible bag having an approximately pipe diameter base opening; a leaf spring attached to and extending across each base side of the bag normally in a straight line for open damper condition; a screw-threaded rod revolubly carried by said pipe along and in substantial parallelism with said springs; carriers, to which ends of the springs are secured, revolubly mounted on said rod; one at least of said carriers being screw-threadedly engaged with said rod to bow and straighten said springs in accordance with selected directions of rotation of said rod.

9. A damper construction for varying volume flow comprising a pipe; a collapsible damper comprising a generally triangular shaped flexible bag having an approximately pipe diameter base opening; a leaf spring attached to and extending across each base side of the bag normally in a straight line for open damper condition; a screw-threaded rod revolubly carried by said pipe along and in substantial parallelism with said springs; carriers, to which ends of the springs are secured, revolubly mounted on said rod; one at least of said carriers being screw-threadedly engaged with said rod to bow and straighten said springs in accordance with selected directions of rotation of said rod; and spring means yieldingly extending substantially normally from said rod to the apex of said bag to hold the bag wall taut.

10. A damper construction for varying volume flow comprising a pipe; a collapsible damper comprising a generally triangular shaped flexible bag having an approximately pipe diameter base opening; a leaf spring attached to and extending across each base side of the bag normally in a straight line for open damper condition; a screw-threaded rod revolubly carried by said pipe along and in substantial parallelism with said springs; carriers, to which ends of the springs are secured, revolubly mounted on said rod; one at least of said carriers being screw-threadedly engaged with said rod to bow and straighten said springs in accordance with selected directions of rotation of said rod; and spring means yieldingly extending substantially normally from said rod to the apex of said bag to hold the bag wall taut; and elastic stays extending from said apex to said leaf springs distending said bag as said leaf springs may bow outwardly one from the other under said rod rotation.

11. A damper construction for varying volume flow comprising a pipe; a collapsible damper comprising a generally triangular shaped flexible bag having an approximately pipe diameter base opening; a leaf spring attached to and extending across each base side of the bag normally in a straight line for open damper condition; a screw-threaded rod revolubly carried by said pipe along and in substantial parallelism with said springs; carriers, to which ends of the springs are secured, revolubly mounted on said rod; one at least of said carriers being screw-threadedly engaged with said rod to bow and straighten said springs in accordance with selected directions of rotation of said rod; and spring means yieldingly extending substantially normally from said rod to the apex of said bag to hold the bag wall taut; a bar carried by said pipe parallel to said rod; and slide means interengaging said spring means with said bar to hold said bag against revolving about said rod.

BEN CONES.

REFERENCES CITED

The following references are of record in the file of this patent:

UNITED STATES PATENTS

| Number | Name | Date |
| --- | --- | --- |
| 476,778 | Bibb et al. | June 14, 1892 |
| 608,638 | Becker | Aug. 9, 1898 |
| 861,007 | Wilhelm | July 23, 1907 |
| 1,005,289 | O'Neil | Oct. 10, 1911 |
| 1,758,868 | Telander | May 13, 1930 |
| 2,079,132 | Stathem | May 4, 1937 |

FOREIGN PATENTS

| Number | Country | Date |
| --- | --- | --- |
| 665,666 | Germany | Aug. 4, 1936 |
| 789,467 | France | Oct. 29, 1935 |